A. TAYLOR AND P. W. GRAY.
RANGE KEEPING AND TRANSMITTING INSTRUMENT.
APPLICATION FILED DEC. 29, 1915.

1,357,659.

Patented Nov. 2, 1920.
8 SHEETS—SHEET 1.

A. TAYLOR AND P. W. GRAY.
RANGE KEEPING AND TRANSMITTING INSTRUMENT.
APPLICATION FILED DEC. 29, 1915.

1,357,659. Patented Nov. 2, 1920.
8 SHEETS—SHEET 4.

Fig. 4.

A. TAYLOR AND P. W. GRAY.
RANGE KEEPING AND TRANSMITTING INSTRUMENT.
APPLICATION FILED DEC. 29, 1915.

1,357,659.

Patented Nov. 2, 1920.
8 SHEETS—SHEET 5.

UNITED STATES PATENT OFFICE.

ALFRED TAYLOR AND PERCY WILLIS GRAY, OF YORK, ENGLAND.

RANGE KEEPING AND TRANSMITTING INSTRUMENT.

1,357,659. Specification of Letters Patent. Patented Nov. 2, 1920.

Application filed December 29, 1915. Serial No. 69,219.

*To all whom it may concern:*

Be it known that we, ALFRED TAYLOR and PERCY WILLIS GRAY, subjects of the King of Great Britain, both residing at York, in the county of York, in the Kingdom of England, have invented certain new and useful Improvements in and Relating to Range Keeping and Transmitting Instruments, of which the following is a specification.

The present invention relates to improvements in instruments for indicating or keeping a range, and in certain cases for transmitting the same to remote points.

The present invention is for an instrument for indicating and also, if desired, for transmitting the range of a distant object which may be constantly varying. A stop watch is carried on a spindle adapted to be driven from a hand crank at a constant speed through a variable speed transmission gearing, the ratio of which is altered by the rotation of a second handle which is operated whenever the observed range appears to differ from that which is continuously changing on the instrument.

Such apparatus are adapted to automatically indicate the range under changing conditions. The enemy range having by observation been obtained from the range finder, this value is set on the apparatus and the time is noted. Then, after a lapse of a short period of time the range is again obtained from the range finder whereby the rate of change per minute may be directly calculated from the difference between these two ranges and the period of time. The apparatus will then automatically continue to indicate the actual range under this constant rate of change until this latter factor is altered by further determination and the machine adjusted to a different rate of change. The apparatus may further be combined with means for transmitting an indicated range to one or more receiving instruments at remote points.

The apparatus of the present invention comprises a means for indicating time, such as a stop watch, the movable pointer of which coöperates with a relatively fixed index. The time indicating apparatus may be rotated relatively to a fixed index so that at any moment the moving hand on this can be brought back opposite the index. The stop watch or the like is rotated about an axis taken to be concentric with the center of rotation of its indicating hand, by means providing for a variable speed drive. A set of counting wheels indicating the rate of change of the range per unit of time are connected to the means for controlling the value of the variable speed drive and the actual drive takes place at such time as desired, through the counting wheels indicating the range.

The present invention will be more particularly described with reference to the accompanying drawings illustrating one construction by way of example.

Fig. 9 is a corresponding sectional end view; while

Figure 2:
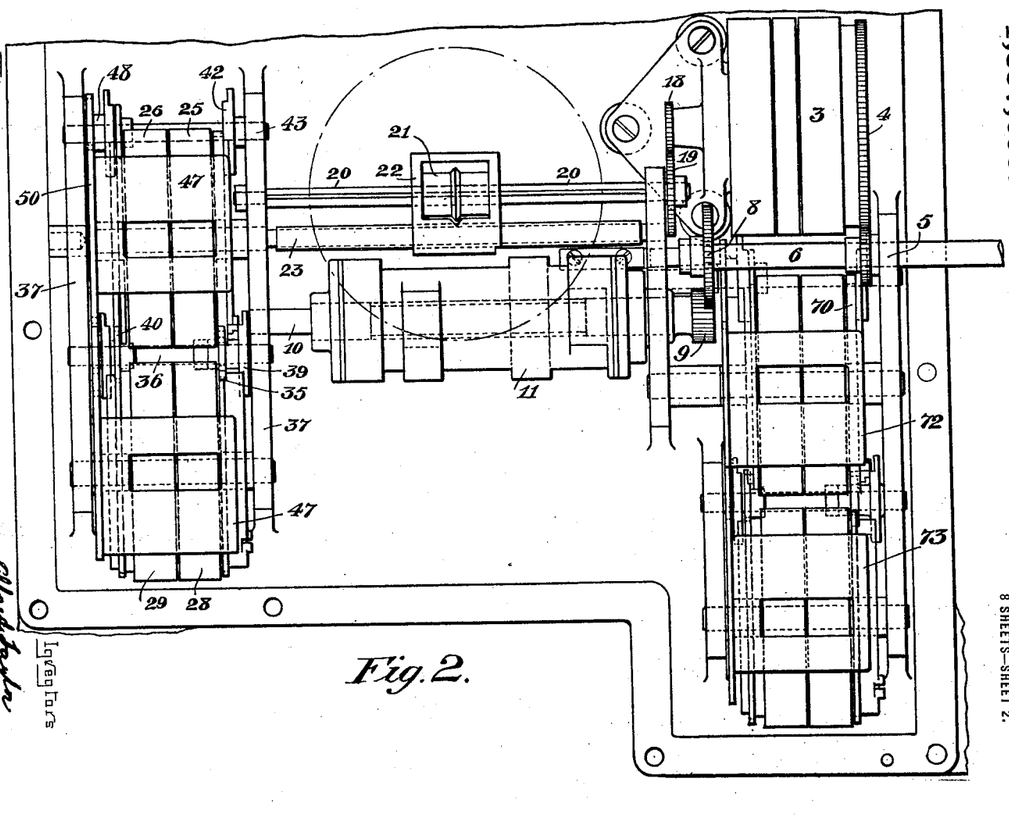
Fig. 2 is a corresponding view with the cover plate removed.
Figure 4:
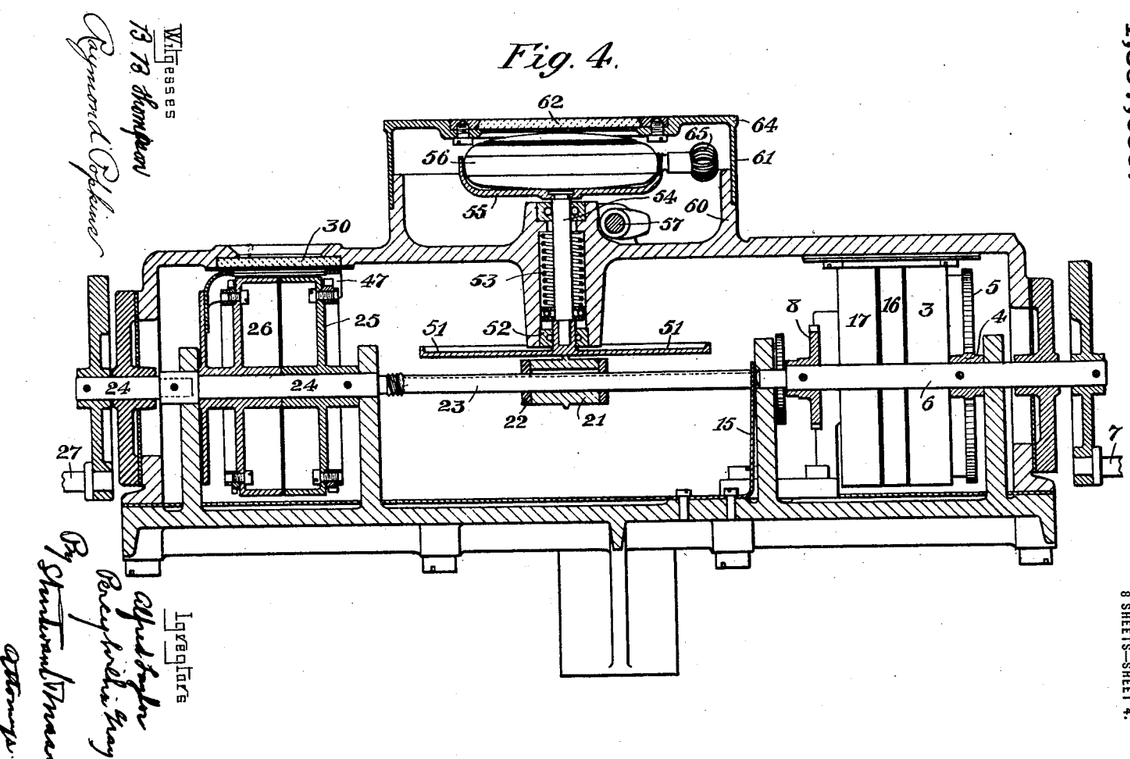
Fig. 4 is a front sectional elevation of the instrument.
Figure 5:
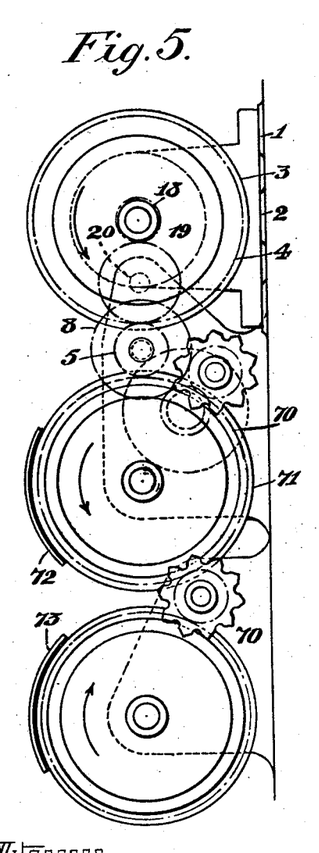
Fig. 5 is a partial end view.
Figure 6:
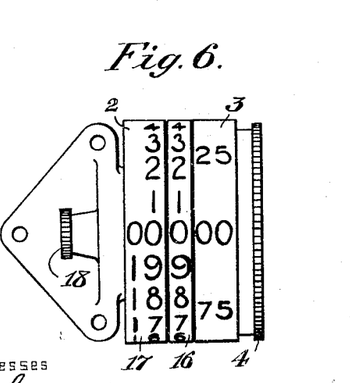
Fig. 6 is a detail view in elevation of the range indicator counting wheels.

The casing 1 contains a number of glazed openings through which are visible a plurality of counting wheels. One set of counting wheels 2 is adapted to show the range at any particular moment, which will be a value similar to that which has been transmitted to a distant point, such as the guns, and is there set up on a similar counter in the receiving apparatus. The units wheel 3 (Fig. 4) of the counter 2 carries a gear wheel 4 which receives motion from a pinion 5 pinned to a shaft 6 carrying the operating crank 7. The shaft 6 may be displaced axially to disengage the gears 4, 5, being normally in the position shown with the gears 4, 5 in engagement by means of a spring 15. The shaft 6 carries a further pinion 8 in constant engagement with the pinion 9 (Fig. 2) irrespective of the limited displacement of the shaft 6. The pinion 9 is keyed to a shaft 10 on which is provided the commutator drum or the like 11

Figure 3:
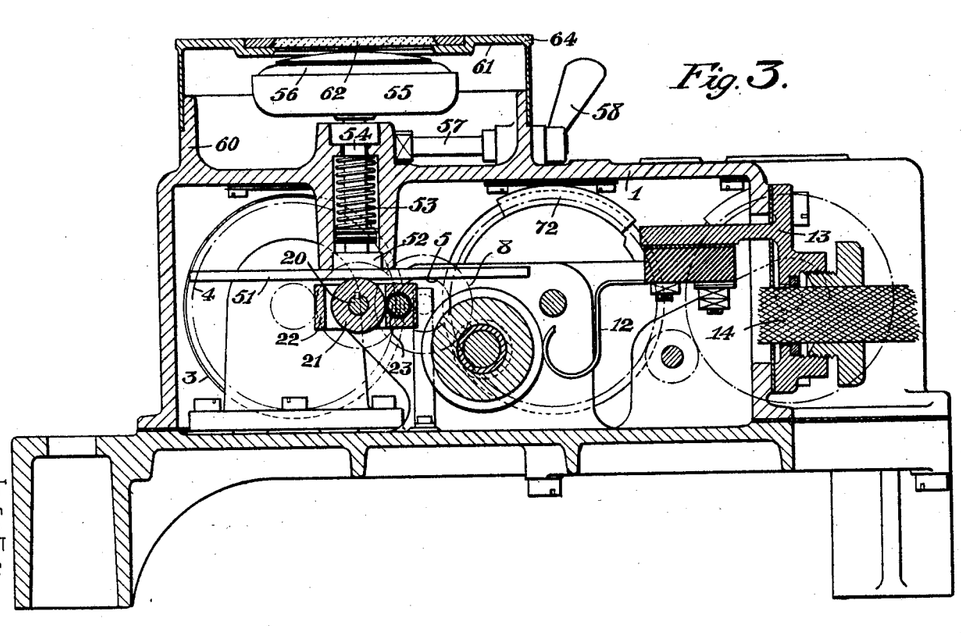
Fig. 3 is an end sectional elevation.

(Fig. 3) adapted to coöperate with a series of contacts 12 carried by an insulative plug 13 inserted in one side of the casing 1. This plug 13 carries the cable 14 for containing the electrical conductors passing to the receiving instrument. Any other form of electric transmitting means may be adopted, the electrical arrangement shown being diagrammatical only. Normally, when a range is determined by the operator at the range finding instrument it will be transmitted to the gun stations or the like by rotating the crank 7 when the shaft 6 is in the position illustrated in Figs. 2 and 4 until the drums 2 will indicate a value corresponding to the observed range. It will be seen that the commutator shaft 10 will be turned a number of revolutions corresponding to the revolutions turned of the counter 2 so that a reading similar to that upon the counter 2 will be present upon the counters of the receiving instruments.

Figure 7:
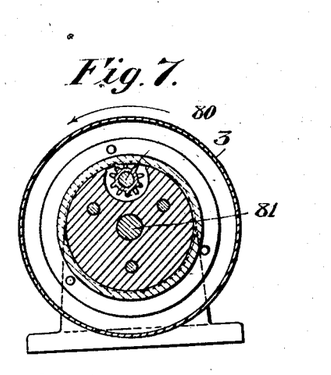
Fig. 7 is a corresponding end sectional view to Fig. 6.
Figure 8:
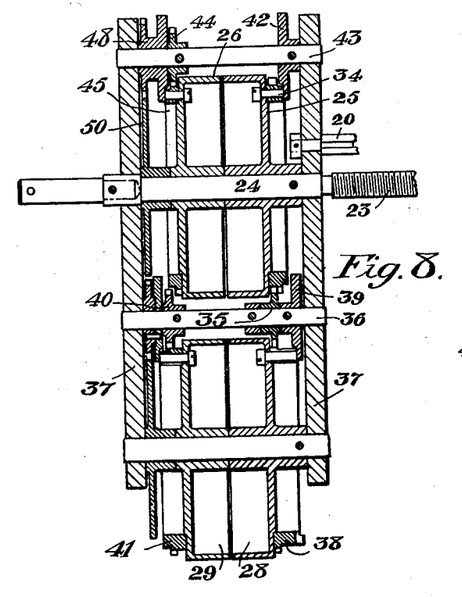
Fig. 8 is a sectional view of the rate of change of range indicating wheels.
Figure 9:
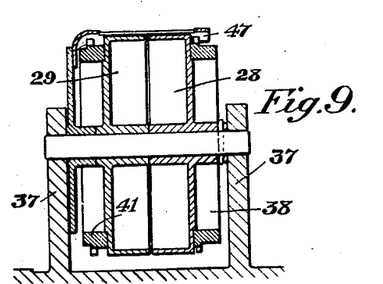
Figure 10:
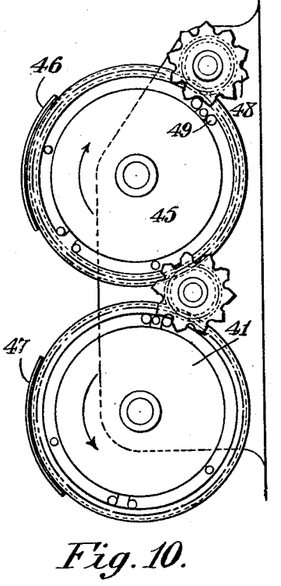
Fig. 10 is an outside side view of the same.
Figure 11:
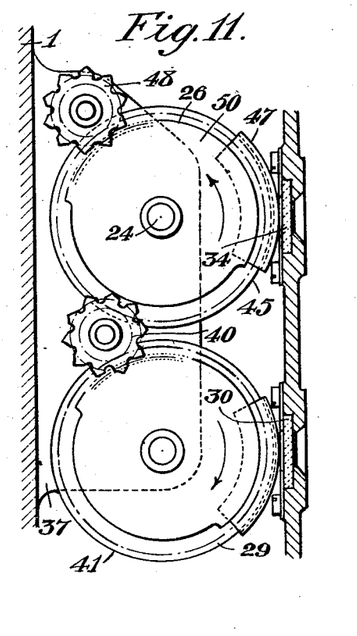
Fig. 11 is a view corresponding to Fig. 10 from the other side.

Such an observed range will not usually remain constant for any length of time, either decreasing or increasing, consequently means are provided to keep the counter 2 rotating so that this will always indicate the actual range at the particular moment, that is to say, that the rate of rotation of the drum will be arranged to be similar to the continuously increasing or decreasing range of the observed body such as an enemy vessel. The counter 2 in the form shown is provided with units and tens wheel 3, hundreds wheel 16 and thousands wheel 17, and tens transference arrangements 80 (Fig. 7) of any usual type are provided between the wheels 16 and 17. The units wheel shaft 81 of the counter 2 carries a gear wheel 18 (Fig. 2) meshing with a gear wheel 19 on a splined shaft 20 on which is longitudinally displaceable a friction wheel 21 carried by a cage 22. The cage 22 is carried upon a threaded spindle 23 so that rotation of this latter will cause displacement of the cage 22 axially along a key-way on it. The spindle 23 has an extension 24 (Fig. 4) to which is keyed the units and tens wheel 25 of a counting indicator adapted to show the change of range in for instance, yards per minute, a hundreds and thousands wheel 26 being arranged loosely on the same shaft connected with the wheel 25 by any usual tens transference means. The spindle 24 carries at its outer end the rate hand wheel and crank 27. The indications on the drums 25 and 26 are only adapted to be visible for instance when the range is increasing, while when the range is decreasing the rate of change will for instance be visible upon a separate set of gear wheels consisting of units and tens wheel 28 and thousands and hundreds wheel 29. Interconnected shutters are adapted to cover over the indicating figures on either one or other drum according as the range is decreasing or increasing. Glazed openings 30 in the lid of the casing 1 are adapted to cover over the two counters and suitable indications are carried thereby as shown at 31 to indicate the nature of the particular counter. A plate 32 carries designations such as "Change of range in yards per minute." A further indicating means such as 33 may be engraved on the lid of the casing 1 to indicate the direction of rotation of the wheel 27 to obtain an alteration of the rate of change of range either as a decrease or an increase. The wheel 25 (Fig. 8) carries at its periphery a toothed annulus 34 which meshes with a pinion 35 loose on the lay shaft 36 mounted in end plates 37 which also serve as bearings for the shaft 24. The gear wheel 35 also meshes with a similar toothed annulus 38 carried by the lower denomination counting wheel 28 of the other indicator. The toothed periphery 38 further carries a pin adapted to engage once per revolution with a tooth on a wheel 39 keyed to the shaft 36, which shaft also carries a pinion 40 meshing with an annulus 41 carried by the hundreds and thousands counting drum 29, the arrangement being such that for every revolution, for instance, of the drum 28, the drum 29 is turned through the gearing 38, 39, 40, through a space of one unit value. A similar "tens" transferring arrangement is provided for the wheels 25, 26, a pin on the annulus 34 moving a pinion 42 on the shaft 43 forward one tooth at every revolution of the wheel 25. This motion is communicated to a pinion 44 pinned to the shaft 43 which is in mesh with a toothed annulus 45 carried by the thousands and hundreds drum 26 so that after the wheel 25 has turned through ten revolutions the drum 26 is moved on the space of one unit in the usual manner. For the purpose of operating shutters 46, 47, one of which is always evident through one or other of the glazed openings 30 at any time, pins 49 (Fig. 10) are carried on the side of the toothed drum 45 to engage with a pinion 48 carried loosely on the shaft 43, when the wheels 25, 26, are adjacent the zero position. The wheel 48 meshes with a toothed segment on a disk 50 loose on the shaft 24 which carries the shutter 46. Similar gearing to that carried by the shaft 43 is arranged upon the shaft 36 to operate the shutter 47 for the lower set of wheels, the arrangement being such as previously stated, that only one shutter is under one of the glazed openings 30 at any time, so that always one set of members is visible depending upon whether the range is increasing or decreasing.

Operation of the handle 27 causes the displacement as above stated of the driving wheel 21, which driving wheel is rotated from the driving crank 7. The driving wheel 21 is adapted to engage with the friction plate 51 slidably mounted in a bearing 52 and normally kept depressed by means of a spring 53. The plate 51 is carried by a spindle 54 which supports at its opposite end a cup 55 for receiving a stop watch or the like 56. The friction driving plate 51 may be removed out of contact with the driving wheel 21 by turning the shaft 57 by means of a handle 58 on the outside of the machine, which will operate the lifting of the spindle 54 against the action of the spring 53. An indicating plate 59 is provided on the outside of the casing to show whether the friction drive is in operation or not. It will be seen that according as to the distance of the driving wheel 21 from the center of the friction plate 51, so will be the ratio of the drive varied either as a positive value or as a negative value. The cup 55 lies in an extension 60 of the casing which is adapted to be inclosed by a cover 61 provided with a glass plate 62 let into its upper face which will have an engraved index 63 to act as a fixed point. The cover 61 preferably has a milled edge 64 so that this can be turned relatively to the extension 60 of the casing for adjustment of the index 63. A hole may be arranged in the side of the cover 61 so that the stop watch 56 may be started or stopped in the normal manner, for instance, by pressing its knob 65. After the stop watch 56 has been started it will be seen that by rotating the handle 7 at a greater or less rate depending on the ratio of transmission selected by the displacement of the driving wheel 21 along the disk 51 by operation of the handle 27, the pointer 66 of the stop watch may be kept opposite the stationary index 63 for a purpose to be set forth more particularly below.

During the time when the plate 51 is in frictional and driving engagement with the driving wheel 21 all normal rotation of the crank 7 will be indicated upon the range indicator 2 and be transmitted through the commutator 11 to the receiving instrument in usual manner. At certain times however it may be desired to interrupt the driving connection between the crank 7 and the range indicator 2 and to add a correction either positive or negative to the value set up on the receiving apparatus. This is effected in the arrangement shown by pushing in the shaft 6 of the crank 7 in the direction of the arrow A, Fig. 1, which will cause a disengagement of the gear 5 with the gear 4 of the range indicator 2, the gears 8 and 9 however of the transmitter remaining in mesh. Rotation of the handle in one direction or the other will now cause not only a further rotation of the commutator 11, but also this further rotation will be indicated either as a positive or negative value upon either one of the two indicators 66 or 67, a name plate 68 being provided on the base of the casing to show that the indicators 66 and 67 indicate a correction to be added to the range reading at the indicator 2 above. Indication means such as 69 may be engraved on the outer side of the casing to show in which direction it is necessary to turn the crank 7 to apply the desired correction either as an addition or a subtraction. By its displacement the pinion 5 comes into engagement with the pinion 70 on the tens and hundreds wheel 71 of the indicator 66. Only one or other of the indicators 66 or 67 is adapted to be visible at any time. Automatic shades 72, 73 being provided, operate through a star and pin mechanism similar to that described with reference to that for the wheels 25, 26, 28, 29. The operation of the indicating wheels of the indicators 66 and 67 is brought about through gearing precisely similar to that described with reference to the rate of change of range indicator 25, 26, 28, 29, and consequently need not be described again in detail.

A range will be determined by a range finder and will immediately be set up upon the indicator 2 to be transmitted to the receiving instruments by a rapid rotation of the crank 7. Immediately the range is received the stop watch 56 is started by a depression of the knob 65 and the zero on the watch dial is set to lie opposite the fixed index 63. The driving mechanism 21, 51, will be out of engagement with the handle 58 lying in the position shown in Fig. 1. Meanwhile observation will have been taken to determine a second range which, when received, will be compared with the watch reading and the rate of change immediately calculated.

To simplify the arrangement and provide for a rapid determination of the rate of change of range a slide rule or the like can be provided in, or form part of the instrument so that as the second range is received from the range finder or observer the rate of change can be directly read off. One of the rate drums consisting of the wheels 25 and 26 or 28 and 29 will then be set to the rate of change of range determined by a rotation of the crank 27 which will cause a displacement of the cage 22 carrying the driving wheel 21 along the threaded spindle 23 so that when the parts 21 and 51 are in driving connection a drive will take place at a predetermined ratio depending on the value, positive or negative, set up on one of the indicators 25 and 26 or 28 and 29. The handle 58 will then be moved over in the direction of the arrow B, Fig. 1, to bring the parts 21, 51, into effective frictional driving coöperation. The watch pointer 66 during the latter operations may possibly have moved still farther on the watch dial relatively away from the fixed index 63 and the range drum 2 will of course be indicating the value of the first observed range. The range handle 7 is therefore rotated to bring the watch pointer 66 gradually back opposite the fixed index 63 when it will be noticed that when the watch pointer is kept to lie opposite this fixed index the range indicated on the range indicator 2 will be the correct range at any moment and this range will of course be transmitted to the receiving instruments through the turning of the commutator 11 in geared connection with the range handle 7, that is to say, that as the handle 7 is rotated at a constant speed to keep the watch 56 stationary relatively to the casing 60, then the counter 2 will be rotated continuously at a fixed rate depending on the relative position of the wheels 21 and 51 as determined by the selection operated by the rate of change of range crank 27.

Figure 1:
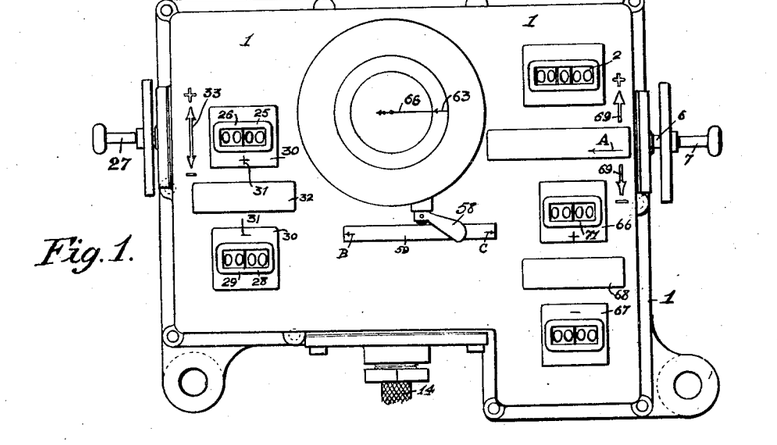
Figure 1 is an outside plan view of one form of apparatus.

After a short time of running it may be found that the rate of change set up on either indicator 30 is too great, the drive should then be interrupted by moving the handle 58 again, away from the arrow B toward the position indicated by the arrow C (Fig. 1). The handle 27 is then rotated to bring the rate drum to a newly selected value, whereby when the handle 58 is again moved over into the position B, the rate will be altered and the speed of drive between the members 21 and 51 varied, at the same time correcting the range reading on the drum 2 by rotating the handle 7. The handle 58 is then moved over again and the drive continued. It may be desired to add to the range indicated on the receiving instruments a correction value, for instance, independent of the direct observation of the range finder indicated by the indicator 2 in such as for instance, those known as spotters corrections, in which case the shaft 6 is displaced axially as above stated and a correction entered on either the indicator 66 or 67 in the manner above set forth, which will cause a rotation of the commutator 11, but not of the range drum 2. It may be desired in certain cases to provide an indicator which will correspond to the actual amount visible on the receiving instruments, that is to say, in addition of the range indicated by the range drum 2 and the correction on the drums 66 and 67.

Means may also be provided on the instrument, if desired, to indicate the correction in the rate of change of range as shown by the indicator 30. It is obvious that other means may be employed for providing for the sending of transmissions to the receiver independent of the range indicator 2. Further, instead of the above mentioned friction driving means providing a variable speed any other suitable mechanism for obtaining this result may be used.

In an alternative form it may be desirable to use a watch or the like time indicating instrument provided with an external means for winding up and operating the stopping and starting of the watch. In one form the spindle of the watch connected with the main spring and operating the starting or stopping of the watch, may be connected to a milled ring mounted for rotation in the casing of the apparatus and plunger means or the like suitably arranged.

Instead, as shown, of a displacement of the shaft 6 inward against spring pressure, this may be free to move but is retained by spring catches or pins in either operative position.

Also, if desired the handle 7 may be arranged to operate the correction counters 66 and 67 independently of the counter 2 by the arrangement of epicyclic gearing or the like between the shaft 6 and the operating shaft of said correction counters.

It is obvious also that a hand operated clutch may be provided between the shaft 6 and the operating shafts of the counter 2 and the counters 66 and 67, so that either may be operated as desired.

In a further modified construction it may be desirable that the crank 7 should be arranged to rotate continuously in one direction irrespective of whether the rate of change of range is positive or negative. This may be obtained by arranging a reversing gear to be interposed between the shaft 6 and the counter 2 controlled by the crank 27 or by other means.

In certain cases it may be desirable to obviate the necessity of hand operation by means of the crank 7 by the provision of a clockwork adapted to drive a disk at constant speed, which disk would conveniently be arranged co-axial and parallel with the disk 51 (Fig. 4) to be in driving engagement with the friction wheel 21, the said driving engagement being preferably capable of interruption when desired. The instrument would then when adjusted by means of the operation of the crank 27, continuously indicate without further manual operation the range at any moment on the counter 2 and also transmit this in such cases where the instrument would be combined with a transmitter, as is the particular construction described by way of example above.

Figure 12:
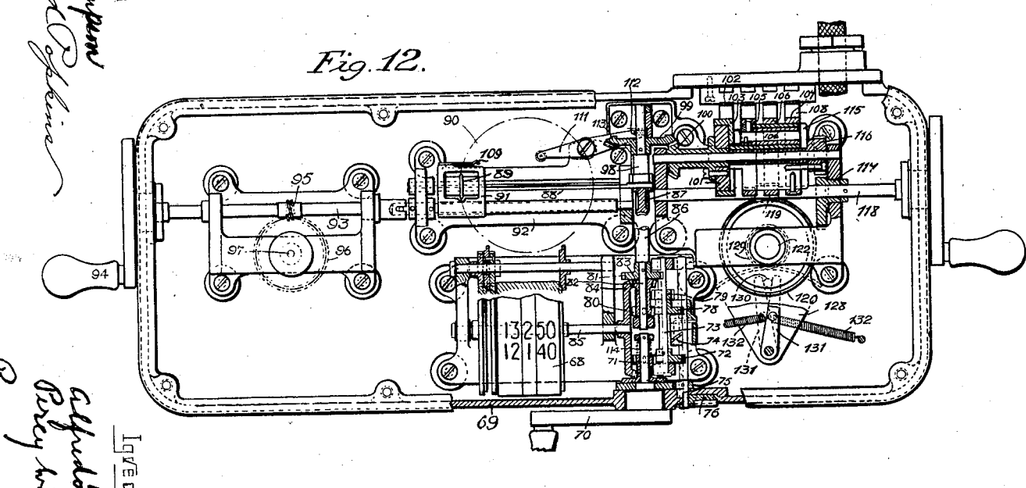
Fig. 12 is a side sectional elevation of a modified form of construction.
Figure 13:
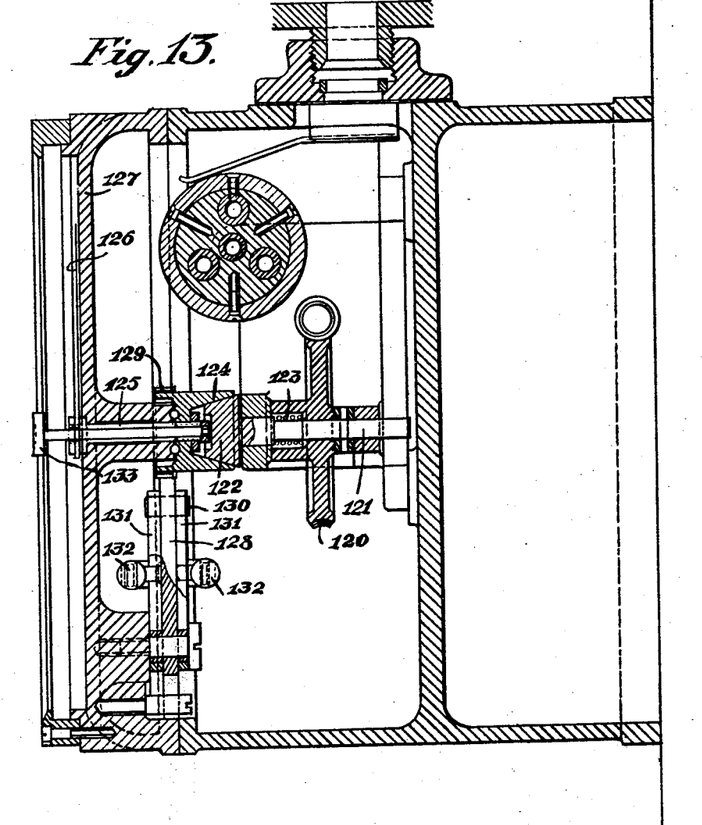
Fig. 13 is a corresponding side view.

A modified form of range keeper is shown in Figs. 12 and 13. The range is indicated as previously, by a set of wheels 68 forming a counter visible through an opening in the casing 69 and turned by a handle 70. The handle 70 turns the counter 68 through a two-speed gear so that when low rates of change of range are being effected, that is to say, when the range is only changing very slowly, the handle 70 can still be swung at a reasonable speed. For this purpose the spindle of the crank 70 is keyed to a pinion 71 meshing with a pinion 72 on a lay shaft 73. The lay shaft 73 carries a pair of pinions 78, 79, mounted on a sleeve sliding on a spindle 73 and adapted to be displaced by a fork operated from a cam slot 74 in a sleeve mounted on a spindle 75 in bearings in the apparatus and adapted to be turned by a finger piece 76. The drive from the spindle 73 passes to one of two pinions 80, 81, pinned to a spindle 82 carrying a bevel wheel 83 meshing with a bevel wheel 84 on the spindle 85 of the indicator 68. In the position shown the movement of the crank passes by pinions 71, 72, through pinions 78, 80, and thence by bevel gear 83, 84, to the indicator 68. The operation however of the finger 76 will cause displacement of the pinions 78, 79 to bring the pinion 78 out of gear with the pinion 80 and place the pinion 79 in gear with the pinion 81 to provide a different ratio of transmission.

The spindle 82 has an extension 86 carrying a worm driving the worm wheel 87 on the shaft 88 of a friction wheel 89 driving the friction disk 90, as in the manner of the constructions above described. The friction wheel 89 is carried by a cage 91 having a threaded bush engaging a threaded spindle 92 so that rotation of the spindle 92 displaces the friction wheel 89 over the surface of the disk 91 to give a varying rate of transmission to the watch or the like carried on the spindle of the disk 90. The turning of the spindle 92 is effected through spindle 93 provided with operating crank 94, which spindle 93 is also provided with a worm 95 engaging with a worm wheel 96, on the spindle 97 of which is mounted a pointer moving over a disk to indicate the particular rate of change of range corresponding to which the drive between the members 89 and 90 stands at any particular moment. The spindle 86 is further connected to a spindle 98 on which is carried a bevel wheel 99 meshing with a bevel wheel 100 on a sleeve connected to a commutator 101 to which current is led from a brush 102. The commutator 101 distributes current from its segments 103 to a brush 104 leading current to the segments 105, 106, 107, of usual form. On the segments 105, 106, 107, are arranged the usual collecting brushes 108 which pass to the indicating instrument on the guns or like remote point. It will be seen therefore that normal rotation of the crank 70 will turn the commutator 101 to distribute current to the various segments 105, 106, 107 and consequently send current impulses in predetermined ratio and speed out from the instrument in known manner.

It is inadvisable that any transmission of power through the friction gear 89, 90 should take place at very low rates of change of range. Consequently, means are provided to interrupt the drive. For this purpose a spring finger 109 is mounted on the cage 91 of the gear wheel 89 which, when the wheel 89 is about the center of the friction disk 90, engages with a roller 110 on a pivoted lever 111 which at its opposite end has a locking bar 112 adapted to engage between toothed stops 113 on the bevel wheel 99. Consequently, it will be seen that when the spring 109 lifts the end 110 of the lever 111 the bevel wheel 113 will be stopped by the locking bar 112 and consequently further rotation of the spindle 88 or of the bevel wheel 100 will be prevented. To prevent breaking of any parts of the instrument the drive from the spindle 70 to the pinion 71 takes place through a strong spring clutch 114, so that the handle 70 may still be turned even after the locking of the wheel 99 has been effected.

As the wheel 99 may not be standing with a gap between two locking teeth 113 exactly opposite the bar 112, it will be obvious that it is desirable to arrange the operating member 109 as a spring as if this was not the case, breakage of a part would occur. As the arrangement is made however, even if the arm 112 is not free to fall into locking engagement with the teeth 113 on the wheel 99 but lies directly opposite one of these teeth, the spring 109 will merely be compressed until such time as a gap does lie opposite the bar 112.

In order to provide for the addition or subtraction of spotters corrections to the range transmitted through the electrical transmitter the members 105, 106, 107, are arranged to be differentially displaceable relatively to the commutator element 101. For this purpose they are mounted on a sleeve 115 carried by a pinion 116 driven by a pinion 117 on a spindle 118 provided with a handle which can be turned for the application of spotters corrections or any other like correction to the indicated range, as observed upon the indicator 68. It will be seen that displacement of the members 105, 106, 107, in one direction or the other will effect the desired added corrections.

The spindle 118 has a worm 119 engaging with a worm wheel 120, pinned to a spindle 121 carrying one member 122 of a friction clutch. The spindle 121 is capable of being slid relatively to the wheel 120 but is normally kept in the clutch engaged position by means of a spring 123. The driven member of the friction clutch 124 is mounted in ball bearings on the casing and is keyed to a sleeve 125 carrying the pointer or finger 126 moving over a dial 127 on the outside of the casing, to indicate the correction applied.

If desired, the correction applied may be always made a permanent one. It is preferable however, in the arrangement shown that means may be provided to erase the spotters correction. This will be immaterial, particularly on instruments where an added counter is provided on the instrument showing the precise figure as it appears on the remote instrument, that is to say, the range appearing on the counter 68 taking into account all corrections.

As a spotters correction indicator however, it is desired to provide means to erase the reading shown by the pointer 126. For this purpose a "fly-back" arrangement is provided consisting of a segmental rack 128 engaging with a pinion 129 on the friction member 124. The segmental rack 128 carries pins 130 against which arms 131 bear drawn by tension springs 132 in either direction. A spring plunger 123 passes through the sleeve 125 and is adapted to displace the member 122 out of engagement with the friction member 124 against the action of the spring 123, when consequently it will be seen that the springs 132 will keep the hand 126 in the zero position so that after the application of a spotters correction which will be transmitted to the hand 126 through the friction drive 123, 124, this may be erased and the handle 126 immediately returned to the zero position by the springs 132 by pressure on the spindle 133.

We claim as our invention:—

1. An indicating instrument comprising an index, a second index coöperating therewith, means to move said index at a constant speed in space, a variable speed gear, a shaft driving one member thereof, a second shaft connecting the other member thereof with said first index, means to change the ratio of drive between said members, an indicator connected to said means, and a handle on said first shaft to rotate it at a varying speed to give a precessional movement to said first index opposite and equal to its constant movement to hold it at rest in space.

2. An indicating instrument comprising an index, a second index coöperating therewith, means to move said index at a constant speed in space, a variable speed gear, a shaft driving one member thereof, a second shaft connecting the other member thereof with said first index, means to change the ratio of drive between said members, an indicator connected to said means, a handle on said first shaft to rotate it at a varying speed to give a precessional movement to said first index opposite and equal to its constant movement to hold it at rest in space, and a counter connected to said first shaft.

3. An indicating instrument comprising an index, a second index coöperating therewith, means to move said index at a constant speed in space, a variable speed gear, a shaft driving one member thereof, a second shaft connecting the other member thereof with said first index, means to change the ratio of drive between said members, an indicator connected to said means, a handle on said first shaft to rotate it at a varying speed to give a precessional movement to said first index opposite and equal to its constant movement to hold it at rest in space, means to interrupt the connection of said handle with said first shaft, and means to indicate the movement of said handle when disconnected.

4. An indicating instrument comprising an index, a second index coöperating therewith, means to move said index at a constant speed in space, a variable speed gear, a shaft driving one member thereof, a second shaft connecting the other member thereof with said first index, means to change the ratio of drive between said members, an indicator connected to said means, a handle on said first shaft to rotate it at a varying speed to give a precessional movement to said first index opposite and equal to its constant movement to hold it at rest in space, and means to interrupt the driving connection between said variable speed gear and said constantly rotating index.

In witness whereof, we have hereunto signed our names this 17th day of December, 1915, in the presence of two subscribing witnesses.

ALFRED TAYLOR.
PERCY WILLIS GRAY.

Witnesses:
 CHARLES DOWNEY,
 GEORGE WILLIAM CURRY.